United States Patent
Liu et al.

(10) Patent No.: US 8,115,896 B2
(45) Date of Patent: Feb. 14, 2012

(54) LIQUID CRYSTAL DISPLAY AND DRIVING METHOD THEREOF

(75) Inventors: Sung-Kao Liu, Hsinchu (TW);
Ching-Huan Lin, Hsinchu (TW);
Chih-Ming Chang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1351 days.

(21) Appl. No.: 11/695,619

(22) Filed: Apr. 3, 2007

(65) Prior Publication Data
US 2008/0192196 A1    Aug. 14, 2008

(30) Foreign Application Priority Data

Feb. 12, 2007   (TW) ............................... 96105012 A (51) Int. Cl.
*G02F 1/1343* (2006.01)
(52) U.S. Cl. ....................................................... 349/139
(58) Field of Classification Search ................... 349/139
See application file for complete search history.

(56) References Cited

U.S. PATENT DOCUMENTS

| 6,100,953 | A  | * | 8/2000  | Kim et al. ...................... 349/129 |
| 6,335,776 | B1 |   | 1/2002  | Kim et al. |
| 7,167,225 | B2 |   | 1/2007  | Kim |
| 7,554,622 | B2 | * | 6/2009  | Nakanishi et al. ............... 349/48 |
| 7,684,000 | B2 | * | 3/2010  | Wang et al. ..................... 349/146 |
| 7,737,934 | B2 | * | 6/2010  | Shih et al. ....................... 345/94 |
| 2001/0019388 | A1 |   | 9/2001  | Kim et al. |
| 2002/0005927 | A1 |   | 1/2002  | Ko et al. |
| 2002/0063835 | A1 |   | 5/2002  | Kim |
| 2004/0252272 | A1 | * | 12/2004 | Takatori et al. ............... 349/179 |
| 2006/0012741 | A1 | * | 1/2006  | Mizusako ..................... 349/130 |

FOREIGN PATENT DOCUMENTS

| JP | 11-142881 | * | 5/1999 | ...................... 349/38 |
| TW | 200535533 |   | 11/2005 |
| TW | 200612138 |   | 4/2006 |

OTHER PUBLICATIONS

"Office Action of Taiwan Counterpart Application", issued on May 24, 2011, p. 1-p. 6, in which the listed references were cited.

* cited by examiner

*Primary Examiner* — Mark Robinson
*Assistant Examiner* — Charles Chang
(74) *Attorney, Agent, or Firm* — Jianq Chyun IP Office (57) ABSTRACT

A liquid crystal display including an active device array substrate, an opposite substrate disposed above the active device array substrate and a liquid crystal layer disposed between the active device array substrate and the opposite substrate is provided. The active device array substrate has a plurality of signal lines, a plurality of active devices electrically connected with corresponding signal lines, a plurality of pixel electrodes electrically connected with corresponding active devices, and an auxiliary electrode. The auxiliary electrode is disposed between the pixel electrodes. Besides, the opposite substrate has a common electrode. The voltage difference applied between the common electrode and the pixel electrode is smaller than that applied between the auxiliary electrode and the pixel electrode. Additionally, a driving method for the above-mentioned liquid crystal display is also provided.

19 Claims, 6 Drawing Sheets

LIQUID CRYSTAL DISPLAY AND DRIVING METHOD THEREOF

CROSS-REFERENCE TO RELATED APPLICATION

This application claims the priority benefit of Taiwan application serial no. 96105012, filed Feb. 12, 2007. All disclosure of the Taiwan application is incorporated herein by reference.

BACKGROUND OF THE INVENTION

1. Field of the Invention

The present invention relates to a display device. More particularly, the present invention relates to a liquid crystal display (LCD).

2. Description of Related Art

In current market, thin film transistor liquid crystal displays (TFT-LCD) are required to be developed towards the trend of high contrast ratio, no grayscale inversion, little color shift, high luminance, high color abundance, high color saturation, quick response, and wide viewing angle, etc. Recently, the technologies capable of satisfying the wide viewing angle requirement include twisted nematic (TN) LCD, super-twisted nematic (STN) LCD, in-plane switching (IPS) LCD, fringe field switching (FFS) LCD, and multi-domain vertically alignment (MVA) TFT-LCD, etc. Taking the MVA LCD panel as an example, because alignment protrusions or slits formed on a color filter substrate or on a TFT array substrate may make the liquid crystal molecules be arranged in multiple directions, so as to obtain a plurality of different alignment domains, and thus, the MVA LCD panel can satisfy the wide viewing angle requirement.

Figure 1:
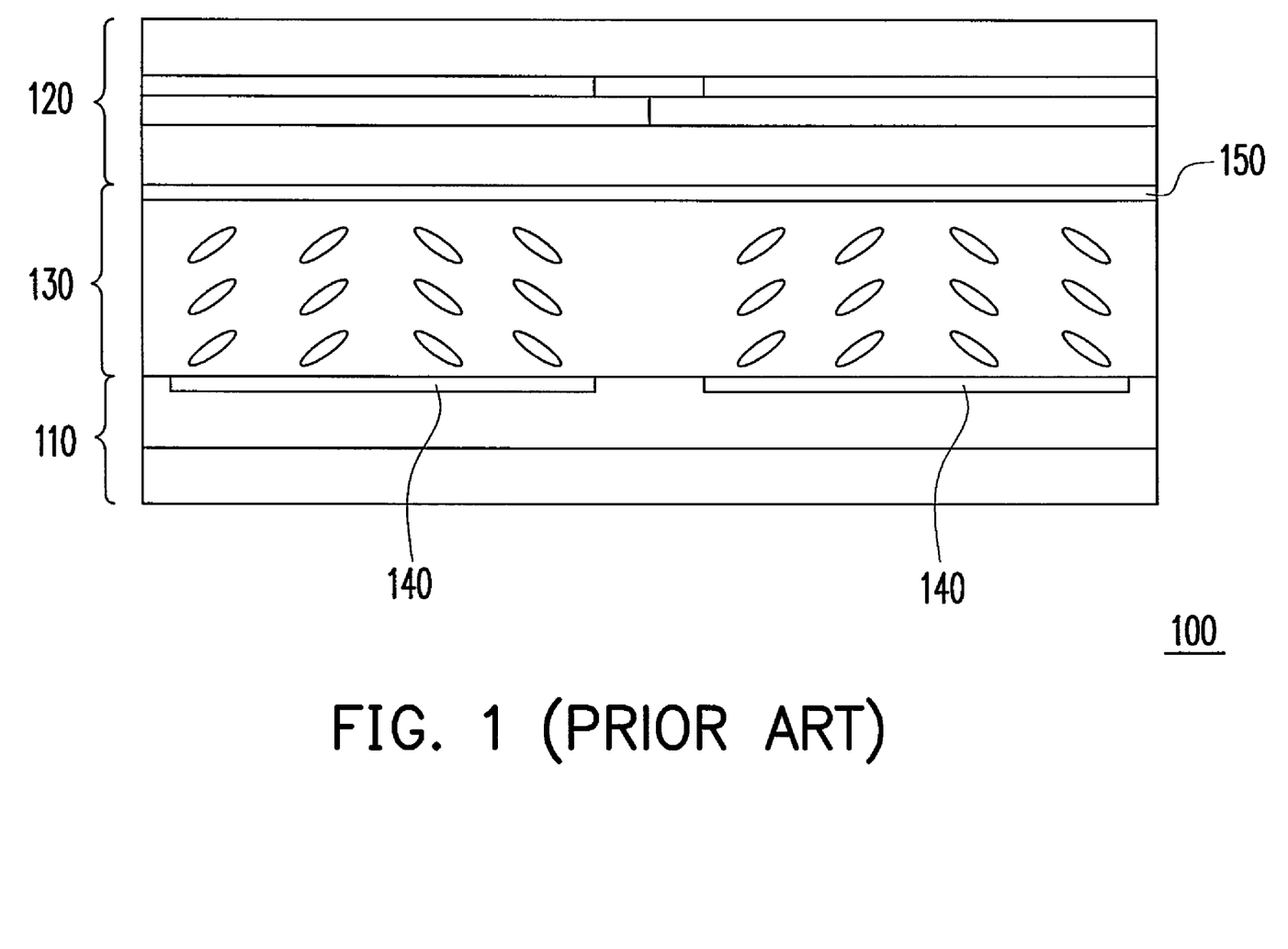
FIG. 1 is a schematic sectional view of a conventional LCD.

FIG. 1 is a schematic sectional view of a conventional LCD. Referring to FIG. 1, the LCD 100 includes an active device array substrate 110, an opposite substrate 120, and an LC layer 130 disposed between the active device array substrate 110 and the opposite substrate 120. As shown in FIG. 1, the active device array substrate 110 has a plurality of pixel electrodes 140, and the opposite substrate 120 has a common electrode 150. The liquid crystal molecule above the pixel electrode 140 twists to different degrees under the effect of the voltage difference between the pixel electrode 140 and the common electrode 150, so that the LCD 100 is capable of displaying predetermined grayscales. However, the response speed of such LCD is usually limited by the driving voltage applied to the pixel electrode 140 and the material of the liquid crystal molecules, such that the blurring phenomenon occurs when the LCD displays animations.

Conventional technologies for improving the response speed of the LCD have been put forward one after another, such as U.S. Pat. No. 7,167,225, No. 6,100,953, and No. 6,335,776, etc. For example, U.S. Pat. No. 6,335,776 provides that the voltage between the auxiliary electrode and the pixel electrode is used to control the LC alignment.

SUMMARY OF THE INVENTION

Accordingly, the present invention is directed to an LCD having a relatively short response time.

The present invention is further directed to a method of driving the LCD having a relatively quick response speed.

As embodied and broadly described herein, the present invention provides an LCD including an active device array substrate, an opposite substrate disposed above the active device array substrate, and an LCD layer disposed between the active device array substrate and the opposite substrate. The active device array substrate includes a plurality of signal lines, a plurality of active devices electrically connected to the corresponding signal lines, a plurality of pixel electrodes electrically connected to the corresponding active devices, and an auxiliary electrode. The auxiliary electrode is disposed above the signal lines. In addition, the opposite substrate has a common electrode, and the voltage difference between the common electrode and the pixel electrode is smaller than that between the auxiliary electrode and the pixel electrode.

According to an embodiment of the present invention, the opposite substrate has a plurality of alignment protrusions disposed above the pixel electrodes.

According to an embodiment of the present invention, the signal line includes a plurality of scan lines, a plurality of data lines, and a common line located under the pixel electrode, and the common line is, for example, electrically connected to the auxiliary electrode.

According to an embodiment of the present invention, the auxiliary electrode is, for example, disposed above the data lines and the common line.

According to an embodiment of the present invention, the auxiliary electrode includes a transparent electrode.

According to an embodiment of the present invention, the auxiliary electrode and the pixel electrode is fabricated by the same material layer, and the auxiliary electrode is located between the pixel electrodes. In other embodiments, the auxiliary electrode includes a metal electrode.

According to an embodiment of the present invention, the auxiliary electrode is disposed under the pixel electrode, and the auxiliary electrode overlaps with an edge part of each pixel electrode.

According to an embodiment of the present invention, the LCD further includes an auxiliary voltage source electrically connected to the auxiliary electrode, in which the auxiliary voltage source is suitable for providing an AC voltage or a DC voltage.

According to an embodiment of the present invention, the LCD further includes a common voltage source electrically connected to the common electrode, in which the common voltage source is suitable for providing an AC voltage or a DC voltage.

According to an embodiment of the present invention, the absolute value of the voltage difference between the common electrode and the auxiliary electrode is smaller than or equal to 3 Volt.

According to an embodiment of the present invention, the voltage of the common electrode falls between the voltage of the pixel electrode and that of the auxiliary electrode.

The present invention provides a driving method for driving an LCD. The LCD includes an active device array substrate, an opposite substrate, and an LC layer disposed between the active device array substrate and the opposite substrate. The opposite substrate is disposed above the active device array substrate, and has a common electrode. The active device array substrate includes a plurality of scan lines, a plurality of data lines, a plurality of active devices electrically connected with the corresponding scan lines and data lines, a plurality of pixel electrodes electrically connected to the corresponding active devices, and an auxiliary electrode. The auxiliary electrode is disposed between the pixel electrodes. The driving method includes the following steps: firstly, an over-drive voltage is applied to the auxiliary electrode; and then, an image data is written into a pixel electrode through the data lines.

According to an embodiment of the present invention, the over-drive voltage is applied to the auxiliary electrode by an auxiliary voltage source.

According to an embodiment of the present invention, through the above driving method, the voltage difference between the common electrode and the pixel electrode is smaller than that between the auxiliary electrode and the pixel electrode, and the voltage of the common electrode falls between the voltage of the pixel electrode and that of the auxiliary electrode. Additionally, together with the over-drive method, the gray to gray response is effectively improved.

Based upon the above description, in the present invention, the whole response speed of the LCD can be increased through controlling the voltage of the auxiliary electrode. In addition, in the present invention, an over-drive voltage is input into the auxiliary electrode, so as to accelerate the tilting speed of the LC molecule in the LC layer, and thus, increasing the response speed of the LCD, and enhancing the displaying quality.

In order to make the aforementioned and other objects, features and advantages of the present invention comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2A:
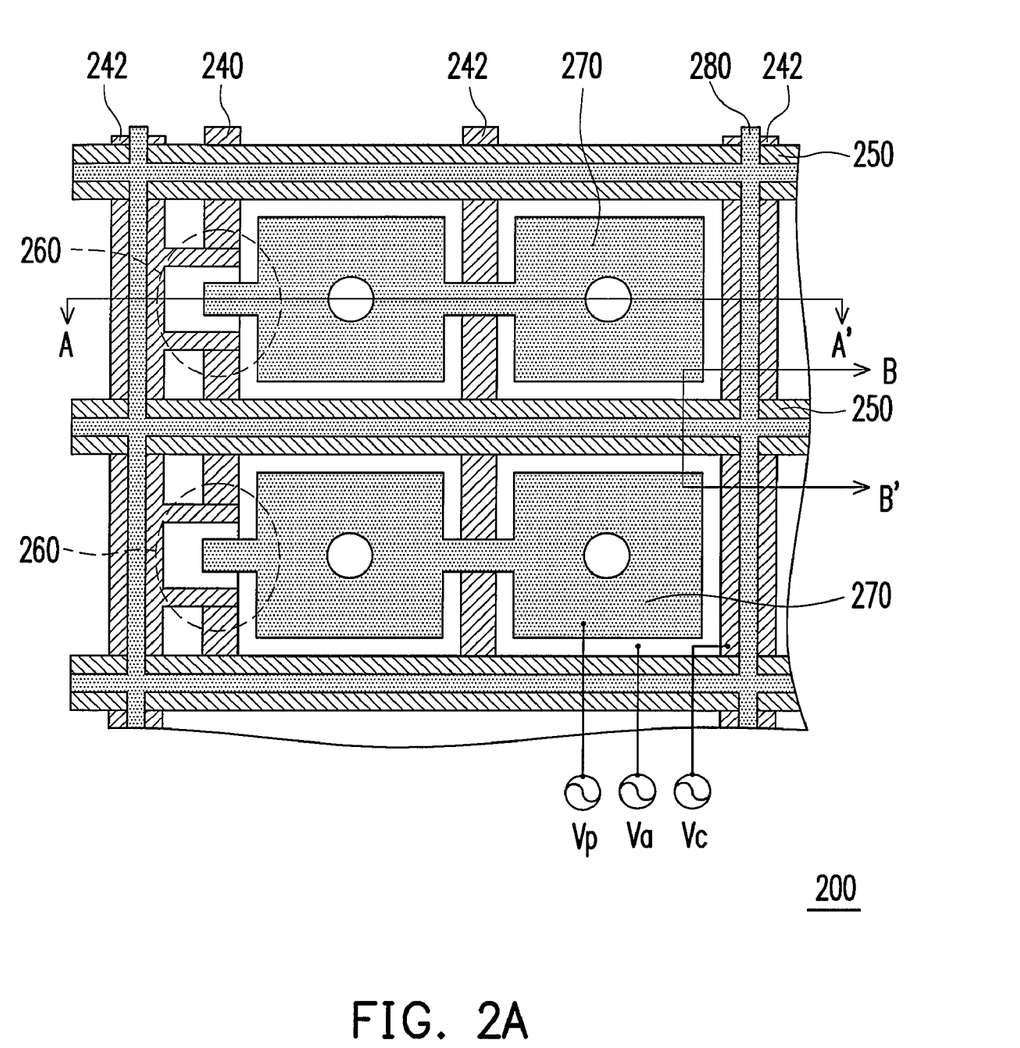
FIG. 2A is a schematic view of an LCD according to the present invention.
Figure 2B:
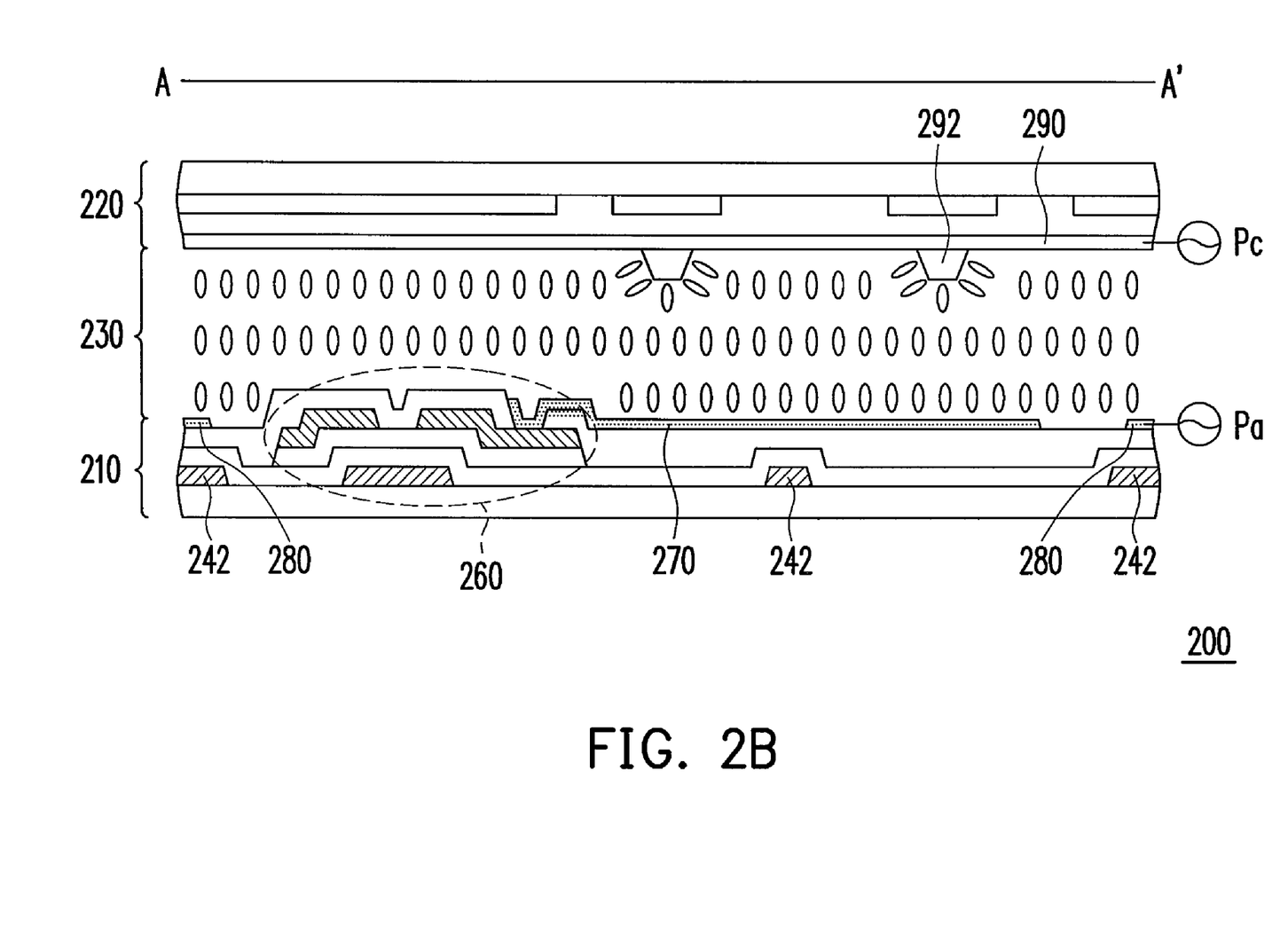
FIG. 2B is a schematic sectional view of FIG. 2A taken along a section line A-A'.

FIG. 2A is a schematic view of an LCD according to the present invention, and FIG. 2B is a schematic sectional view of FIG. 2A taken along a section line of A-A'. Referring to FIGS. 2A and 2B, only two pixels are shown in the LCD 200 for illustration in this embodiment. The LCD 200 of this embodiment includes an active device array substrate 210, an opposite substrate 220 disposed above the active device array substrate 210, and an LC layer 230 disposed between the active device array substrate 210 and the opposite substrate 220. The active device array substrate 210 includes a plurality of signal lines (e.g., the scan lines 240 and the data lines 250), a plurality of active devices 260 electrically connected to the corresponding scan lines 240 and the data lines 250, a plurality of pixel electrodes 270 electrically connected to the corresponding active devices 260, and an auxiliary electrode 280. The active device 260 is, for example, a thin film transistor (TFT) (e.g., an amorphous silicon TFT or a low temperature poly-silicon TFT) or a diode. The auxiliary electrode 280 is, for example, disposed right above the signal lines (e.g., the data lines 250), and located between the pixel electrodes 270. In addition, in FIG. 2A, the opposite substrate 220 has a common electrode 290.

As shown in FIG. 2A, the auxiliary electrode 280 substantially surrounds the pixel electrode 270, but the shape thereof is not limited herein. The auxiliary electrode 280 overlaps with the data line 250, or overlaps with both of the data lines 250 and the common line 242. As for the disposing position of the auxiliary electrode 280, U.S. Patent Publication No. 20010019388 and U.S. Pat. No. 6,335,776 are incorporated therein by reference.

Figure 3A:
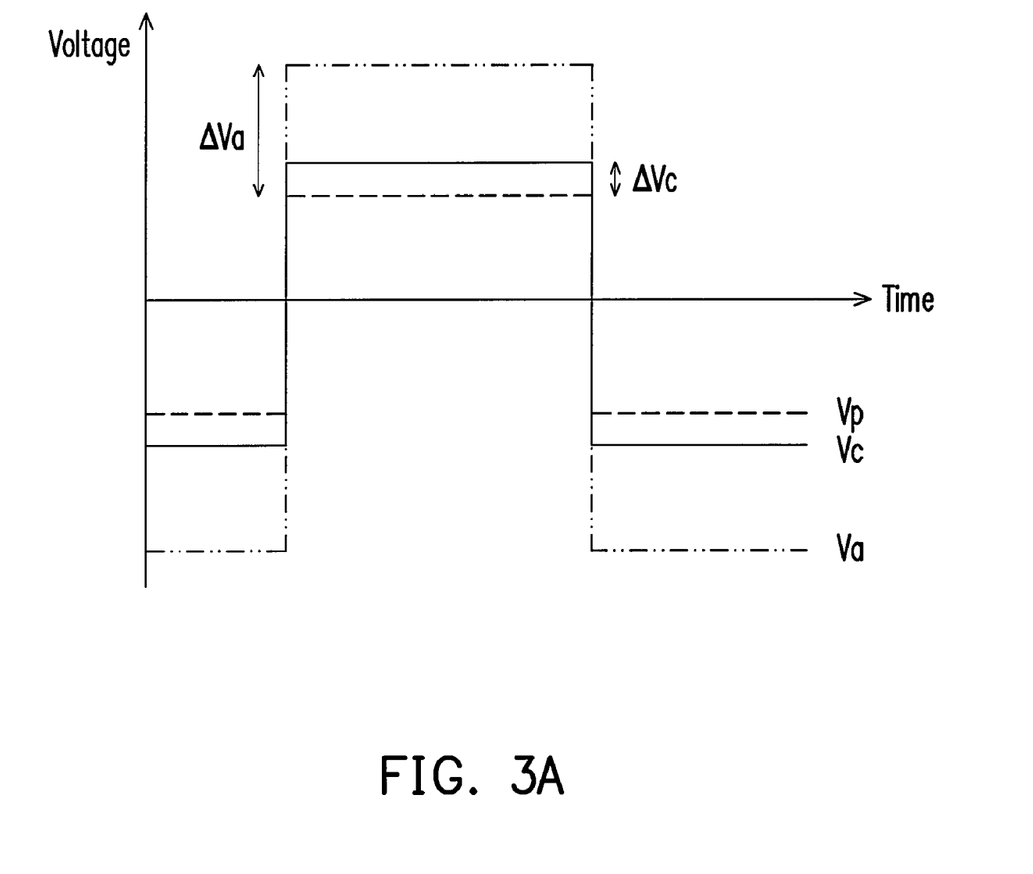
FIG. 3A is a schematic view of a driving waveform for driving the LCD.

It should be noted that, the voltage of the pixel electrode 270 is Vp, the voltage of the common electrode 290 is Vc, and the voltage of the auxiliary electrode 280 is Va. In order to utilize the auxiliary electrode to increase the response speed, the present embodiment makes the voltage difference $\Delta Vc$ (shown in FIG. 3A) between the common electrode 290 and the pixel electrode 270 be smaller than the voltage difference $\Delta Va$ (shown in FIG. 3A) between the auxiliary electrode 280 and the pixel electrode 270, and makes the voltage Vc (shown in FIG. 3A) of the common electrode 290 fall between the voltage Vp (shown in FIG. 3A) of the pixel electrode 270 and the voltage Va (shown in FIG. 3A) of the auxiliary electrode 280. Taking the AC voltage for example, the AC voltage signal transmitted to the auxiliary electrode 280 and the AC voltage signal transmitted to the common electrode 290 have the same phase, and the amplitude of the AC voltage signal transmitted to the auxiliary electrode 280 is greater than that of the AC voltage signal inputted to the common electrode 290, as shown in FIG. 3A. In an embodiment, the voltage Vc of the common electrode 290, the voltage Vp of the pixel electrode 270, and the voltage Va of the auxiliary electrode 280 are all greater than 0 Volt. The voltage Vc of the common electrode 290 is between the voltage Vp of the pixel electrode 270 and the voltage Va of the auxiliary electrode 280. In another embodiment, the voltage Vc of the common electrode 290, the voltage Vp of the pixel electrode 270, and the voltage Va of the auxiliary electrode 280 are all smaller than 0 Volt, and the voltage Vc of the common electrode 290 is between the voltage Vp of the pixel electrode 270 and the voltage Va of the auxiliary electrode 280.

Accordingly, if it is intended to accelerate the response speed of the LCD 200, the voltage signal transmitted into the auxiliary electrode 280 is the key point. In the present embodiment, when the voltage difference $\Delta Va$ (shown in FIG. 3A) between the auxiliary electrode 280 and the pixel electrode 270 is greater than the voltage difference $\Delta Vc$ (shown in FIG. 3A) between the common electrode 290 and the pixel electrode 270, a relatively strong electric field is generated between the auxiliary electrode 280 and the pixel electrode 270, such that the LC molecule close to the edge of the pixel electrode 270 may be quickly tilted. In addition, when the voltage Vc of the common electrode 290 is between the voltage Vp of the pixel electrode 270 and the voltage Va of the auxiliary electrode 280, the LC molecule close to the edge of the pixel electrode 270 is tilted towards a correct direction. After the LC molecule close to the edge of the pixel electrode 270 is quickly and correctly tilted, the LC molecule located above the pixel electrode 270 is pushed by the tilted LC molecule there around, so as to quickly form a multi-domain arrangement. It can be known that, the tilting speed of the LC molecule above the pixel electrode 270 can be accelerated by transmitted the correct voltage signal to the auxiliary electrode 280, such that the response speed of the LCD 200 may be greatly improved.

Referring to FIG. 2B, in this embodiment, the opposite substrate 220 may further include a plurality of alignment protrusions 292 disposed above the pixel electrode 270, for making the LC molecule be arranged in multiple directions, so as to obtain a plurality of different alignment domains, and to enhance the viewing angle. Besides the scan lines 240 and the data lines 250, a common line 242 may be further included on the active device array substrate 210 and disposed under the pixel electrode 270. The common line 242 is, for example, electrically connected to the auxiliary electrode 280. More particularly, the common line 242 electrically connected to the auxiliary electrode 280 may have functions similar to that of the auxiliary electrode 280. This design is helpful for enhancing the response speed of the LCD 200.

Figure 2C:
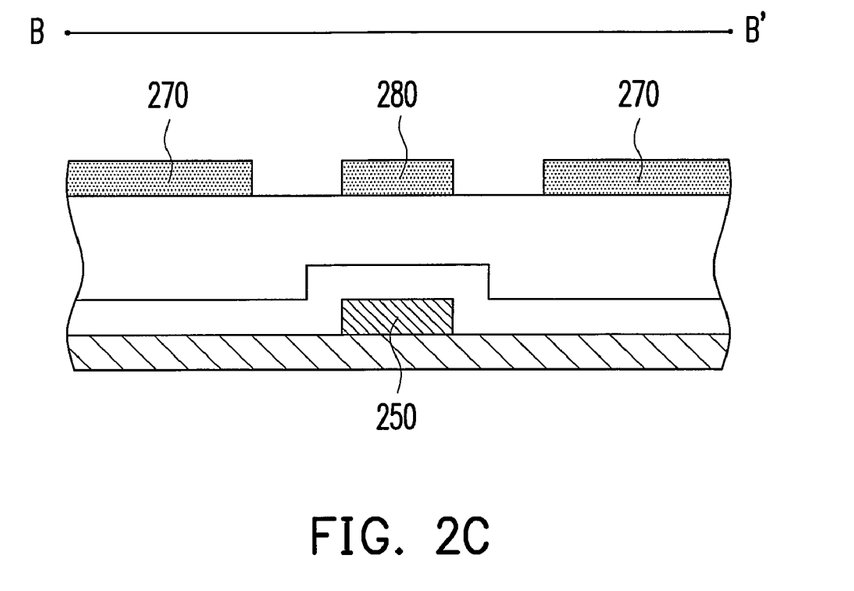
FIG. 2C is a schematic sectional view of FIG. 2A taken along a section line of B-B'.
Figure 2D:
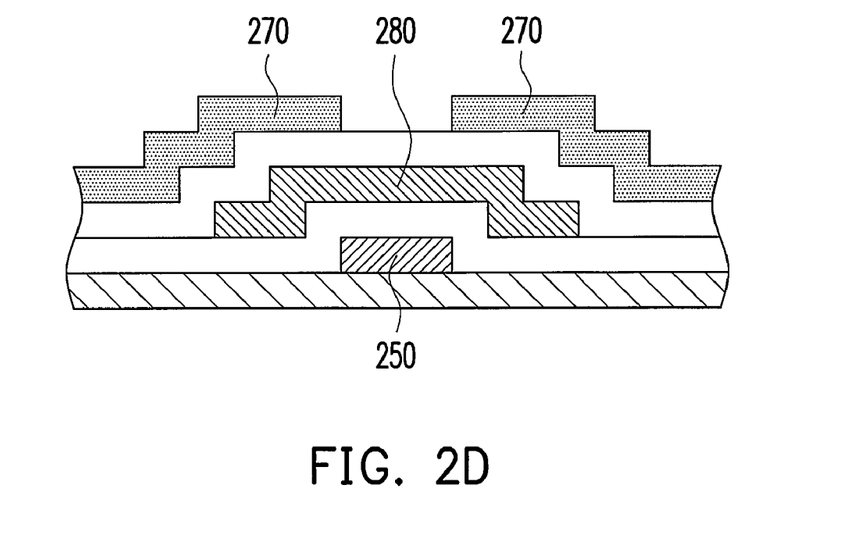
FIG. 2D is a schematic sectional view of another LCD according to the present invention.

FIG. 2C is a schematic sectional view of FIG. 2A taken along a section line of B-B'. Referring to FIG. 2C, in this embodiment, the auxiliary electrode 280 may be a transparent electrode or a metal electrode. When the auxiliary electrode 280 is the transparent electrode, the auxiliary electrode 280 and the pixel electrode 270 may be fabricated by the same material layer. Generally, the auxiliary electrode 280 and the pixel electrode 270 may be made of a transparent conductive material, such as Indium Tin Oxide (ITO) or Indium Zinc Oxide (IZO). Definitely, if the LCD 200 is a reflective LCD, the material of the auxiliary electrode 280 and the pixel electrode 270 may be metal, or another conductive material having the reflecting property. As shown in FIG. 2A or FIG. 2C, the width of the auxiliary electrode 280 is approximately smaller than or equal to that of the data line 250, and the auxiliary electrode 280 is substantially located right above the data line 250. The width of the auxiliary electrode 280 is approximately smaller than or equal to that of the common line 242, and the auxiliary electrode 280 is substantially located right above the common line 242. It should be noted that, in the present embodiment, the relative position of the auxiliary electrode 280 and the pixel electrode 270 is not limited to be disposed as shown in FIG. 2C. For example, in other embodiments of the present invention, the auxiliary electrode 280 may also be disposed under a part of the pixel electrodes 270, and the auxiliary electrode 280 may overlap with the edge part of the pixel electrode 270, as shown in FIG. 2D.

As shown in FIG. 2B, in order to make the voltage of the auxiliary electrode 280 differ from the voltage of the common electrode 290, the LCD 200 of this embodiment may further includes a common voltage source Pc and an auxiliary voltage source Pa. The common voltage source Pc is electrically connected to the common electrode 290, and suitable for providing the AC voltage or the DC voltage. The auxiliary voltage source Pa is electrically connected to the auxiliary electrode 280. One ordinary skilled in the art can use the AC voltage or the DC voltage as the auxiliary voltage source Pa, according to the voltage types provided by the common voltage source Pc. Accordingly, in the LCD 200 of this embodiment, the driving waveforms of the voltage Vp applied to the pixel electrode 270, the voltage Va applied to the auxiliary electrode 280, and the voltage Vc applied to the common electrode 290 of the opposite substrate 220 are shown in FIGS. 3A, 3B, and 3C, which are respectively described below in detail.

FIG. 3A is a schematic view of a driving waveform for driving the LCD. Referring to FIG. 3A, in this embodiment, the voltage signal transmitted to the common electrode 290 is an AC voltage signal, the voltage signal transmitted to the auxiliary electrode 280 is another AC voltage signal, and the two AC voltage signal may have the same phase. As shown in FIG. 3A, if the voltage Vp of the pixel electrode 270 is a positive half period (including a positive voltage level or a negative voltage level), in order to satisfy the condition that the voltage difference ΔVa is greater than ΔVc, the voltage Va of the auxiliary electrode 280 must be higher than the voltage Vc of the common electrode 290. Similarly, when the voltage Vp of the pixel electrode 270 is a negative half period (including a positive voltage level or a negative voltage level), in order to satisfy the condition that the voltage difference ΔVa is greater than ΔVc, the voltage Va of the auxiliary electrode 280 may be lower than the voltage Vc of the common electrode 290. The voltage Va of the auxiliary electrode 280 and/or the voltage Vc of the common electrode 290 are, for example, approximately −10 Volt to 10 Volt.

Figure 3B:
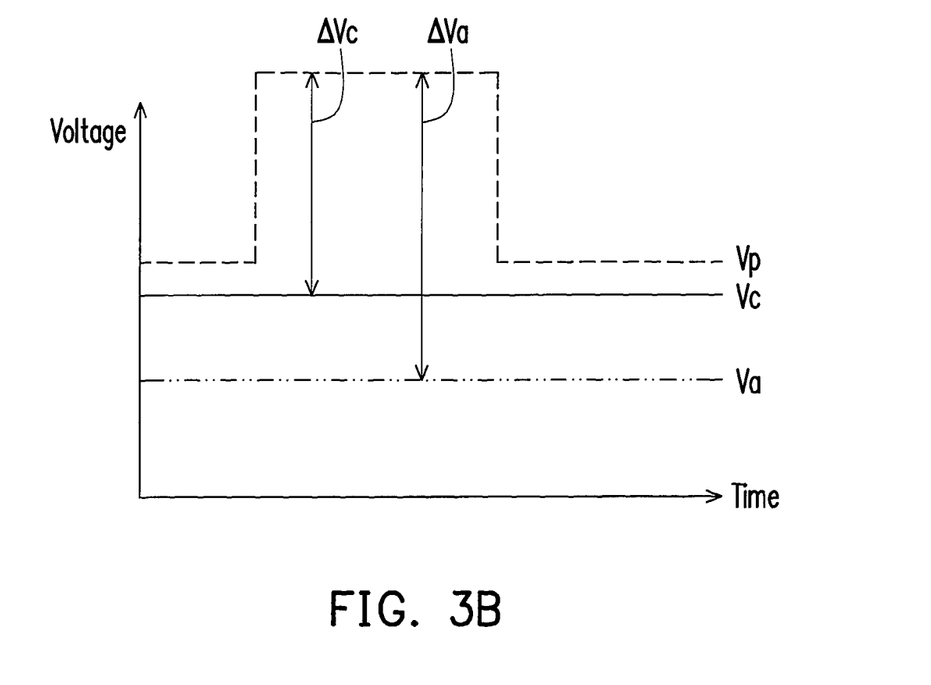
FIG. 3B is a schematic view of another driving waveform for driving the LCD.

FIG. 3B is a schematic view of another driving waveform for driving the LCD. Referring to FIG. 3B, in this embodiment, the voltage signal transmitted to the common electrode 290 is a DC voltage signal, and the voltage signal transmitted to the auxiliary electrode 280 is another DC voltage signal. As shown in FIG. 3B, no matter the voltage Vp of the pixel electrode 270 is a positive half period (including a positive voltage level or a negative voltage level) or a negative half period (including a positive voltage level or a negative voltage level), in order to satisfy the condition that the voltage difference ΔVa is greater than ΔVc, the voltage Va of the auxiliary electrode 280 must be lower than the voltage Vc of the common electrode 290. The voltage Va of the auxiliary electrode 280 and/or the voltage Vc of the common electrode 290 are, for example, approximately −10 Volt to 10 Volt.

Figure 3C:
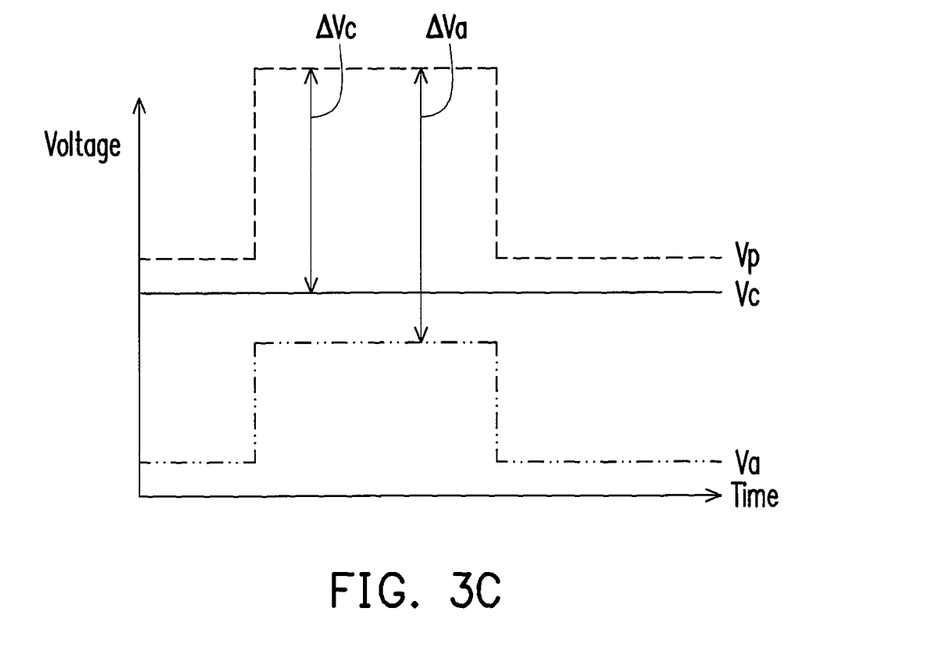
FIG. 3C is a schematic view of still another driving waveform for driving the LCD.

FIG. 3C is a schematic view of still another driving waveform for driving the LCD. Referring to FIG. 3C, in this embodiment, the voltage signal transmitted to the common electrode 290 is a DC voltage signal, the voltage signal transmitted to the auxiliary electrode 280 is an AC voltage signal, and the AC voltage signal transmitted to the auxiliary electrode 280 and the AC voltage signal transmitted to the pixel electrode 270 have the same phase. As shown in FIG. 3C, no matter the voltage Vp of the pixel electrode 270 is a positive half period (including a positive voltage or a negative voltage) or a negative half period (including a positive voltage or a negative voltage), in order to satisfy the condition that the voltage difference ΔVa is greater than ΔVc, the voltage Va of the auxiliary electrode 280 must be lower than the voltage Vc of the common electrode 290. The voltage Va of the auxiliary electrode 280 and/or the voltage Vc of the common electrode 290 are, for example, approximately −10 Volt to 10 Volt.

It should be noted that, besides the circumstance that the voltage Va of the auxiliary electrode 280 must satisfy the condition that ΔVa is greater than ΔVc, the designer should consider the effect of the voltage difference between the auxiliary electrode 280 and the common electrode 290 on the LC molecule. Particularly, in order to avoid the abnormal displaying caused by the LC molecule 280 at the edge of the pixel electrode due to being affected by the excessive voltage difference before the pixel electrode 270 displays the gray-scale, the designer needs to consider the used LC types and the cell gap of the LC layer, so as to select a suitable voltage Va and a voltage Vc. In a preferred embodiment, the absolute value of the difference value between the voltage Va of the auxiliary electrode 280 and the voltage Vc of the common electrode 290 is, for example, smaller than or equal to 3 Volt.

In the above embodiment, the voltage Va of the auxiliary electrode 280 and/or the voltage Vc of the common electrode 290 are, for example, constant values or they are variable.

Besides the efficacy that the above method can enhance the response speed of the LCD 200, in the present invention, an over-drive voltage $V_{OD}$ may be provided during display of the LCD 200, so as to enhance on the gray to gray response speed.

Particularly, the over-drive voltage $V_{OD}$ may be transmitted to the pixel electrode 270 or to the auxiliary electrode 280 before the LCD 200 display image normally. As for the driving method for applying the over-drive voltage $V_{OD}$ to the auxiliary electrode 280, the detailed description is given below.

Referring to FIGS. 2A and 2B, the present invention provides a method for driving the above LCD 200, and includes the following steps. Firstly, an over-drive voltage $V_{OD}$ is applied to the auxiliary electrode 280, such that the LC molecule above the edge of the pixel electrode 270 may be quickly and correctly tilted. When the over-drive voltage $V_{OD}$ is applied to the auxiliary electrode 280, an image data is provided to the pixel electrode 270, that is, an image data is written into the pixel electrode 270 through the data lines 250. In this embodiment, the over-drive voltage $V_{OD}$ is applied to the auxiliary electrode 280 through an auxiliary voltage source Pa. Specifically, in this driving method, the over-drive voltage $V_{OD}$ is inputted to the auxiliary electrode 280 while the image data is written into the pixel electrode 270. In other words, the driving method may accelerate the response speed of the LCD 200. On the other hand, the auxiliary electrode 280 and the common line 242 may couple to the same voltage source. Therefore, the over-drive method can reduce the complexity of the driving circuit and save the circuit cost, without doubling the speed for refreshing the image data of the driving circuit.

Based on the above mentioned, the present invention adopts the auxiliary electrode to provide a suitable auxiliary electrode voltage, so as to enhance the overall response speed of the LCD.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A liquid crystal display (LCD), comprising:
 an active device array substrate, comprising:
  a plurality of signal lines;
  a plurality of active devices electrically connected to the corresponding signal lines;
  a plurality of pixel electrodes electrically connected to the corresponding active devices; and
  an auxiliary electrode disposed above at least one of the signal lines;
 an opposite substrate, disposed above the active device array substrate, comprising a common electrode, wherein a voltage difference between the common electrode and the pixel electrode is smaller than that between the auxiliary electrode and the pixel electrode when a driving voltage is applied to one of the pixel electrodes; and
 a liquid crystal (LC) layer disposed between the active device array substrate and the opposite substrate.

2. The LCD as claimed in claim 1, wherein the opposite substrate further comprising a plurality of alignment protrusions disposed above the pixel electrodes.

3. The LCD as claimed in claim 1, wherein the signal lines comprise a plurality of scan lines, a plurality of data lines, and a common line located under the pixel electrodes.

4. The LCD as claimed in claim 3, wherein the common line is electrically connected to the auxiliary electrode.

5. The LCD as claimed in claim 3, wherein the auxiliary electrode is disposed right above at least one of the data lines.

6. The LCD as claimed in claim 5, wherein a width of the auxiliary electrode is smaller than or equal to that of the data line.

7. The LCD as claimed in claim 1, wherein the auxiliary electrode and the pixel electrodes is fabricated by a same material layer and the auxiliary electrode is located between two neighboring pixel electrodes.

8. The LCD as claimed in claim 1, wherein the auxiliary electrode comprises a metal electrode or a transparent electrode.

9. The LCD as claimed in claim 1, wherein the auxiliary electrode is disposed under the pixel electrodes and the auxiliary electrode overlaps with an edge part of the pixel electrodes.

10. The LCD as claimed in claim 1, further comprising an auxiliary voltage source electrically connected with the auxiliary electrode.

11. The LCD as claimed in claim 10, wherein the auxiliary voltage source is configured to provide an alternating current (AC) voltage or a direct current (DC) voltage.

12. The LCD as claimed in claim 1, further comprising a common voltage source electrically connected to the common electrode.

13. The LCD as claimed in claim 12, wherein the common voltage source is configured to provide an AC voltage or a DC voltage.

14. The LCD as claimed in claim 1, wherein an absolute value of the voltage difference between the common electrode and the auxiliary electrode is smaller than or equal to 3 Volt.

15. The LCD as claimed in claim 1, wherein a voltage of the common electrode is between a voltage of the pixel electrode and that of the auxiliary electrode.

16. A method for driving the LCD as claimed in claim 1, comprising:
 providing an over-drive voltage to the auxiliary electrode; and providing an image data to the pixel electrode.

17. The method as claimed in claim 16, wherein the over-drive voltage is approximately −10 Volt to 10 Volt.

18. The method as claimed in claim 16, wherein a voltage of the common electrode, a voltage of the pixel electrode, and a voltage of the auxiliary electrode are all greater than 0 Volt.

19. The method as claimed in claim 16, wherein a voltage of the common electrode, a voltage of the pixel electrode, and a voltage of the auxiliary electrode are all smaller than 0 Volt.

* * * * *